US009662980B2

(12) United States Patent
Izumi et al.

(10) Patent No.: US 9,662,980 B2
(45) Date of Patent: May 30, 2017

(54) GESTURE INPUT APPARATUS FOR CAR NAVIGATION SYSTEM

(71) Applicant: SHIMANE PREFECTURAL GOVERNMENT, Matsue-shi, Shimane (JP)

(72) Inventors: Kenji Izumi, Matsue (JP); Yuji Shinomura, Matsue (JP); Naoki Fujihara, Matsue (JP)

(73) Assignee: Shimane Prefectural Government, Matsue-shi, Shimane (JP)

( * ) Notice: Subject to any disclaimer, the term of this patent is extended or adjusted under 35 U.S.C. 154(b) by 0 days.

(21) Appl. No.: 14/961,591

(22) PCT Filed: Jun. 6, 2014

(86) PCT No.: PCT/JP2014/003024
§ 371 (c)(1),
(2) Date: Dec. 7, 2015

(87) PCT Pub. No.: WO2014/196208
PCT Pub. Date: Dec. 11, 2014

(65) Prior Publication Data
US 2016/0137061 A1    May 19, 2016

(30) Foreign Application Priority Data
Jun. 7, 2013  (JP) ................. 2013-120899

(51) Int. Cl.
*B60K 35/00*    (2006.01)
*G01C 21/26*    (2006.01)
(Continued)

(52) U.S. Cl.
CPC .............. *B60K 35/00* (2013.01); *G01C 21/26* (2013.01); *G01C 21/3664* (2013.01);
(Continued)

(58) Field of Classification Search
CPC .... B60K 2350/1004; B60K 2350/1052; B60K 35/00; G01C 21/26; G01C 21/3664; G06F 3/017
(Continued)

(56) References Cited

U.S. PATENT DOCUMENTS 6,703,999 B1 *  3/2004  Iwanami ................ B60K 35/00
                                                         345/156
7,437,488 B2 * 10/2008  Ito ....................... B60R 16/0373
                                                         710/15
(Continued)

FOREIGN PATENT DOCUMENTS

GB    2 488 784 A     9/2012
JP    2001-216069     8/2001
(Continued)

OTHER PUBLICATIONS

English version of International Preliminary Report on Patentability dated Dec. 8, 2015.
(Continued)

*Primary Examiner* — Tyler J Lee
(74) *Attorney, Agent, or Firm* — Workman Nydegger

(57) ABSTRACT

Operation of a car navigation system in which a menu is in a hierarchical structure can be performed by simple gestures. The method includes: detecting that a switch is pressed; subsequently detecting a gesture by a sensor; obtaining, from a memory unit, an operation associated with the detected gesture; and outputting, with respect to a screen displayed on a display unit at the time of detecting the gesture, a result of performance of the obtained operation to the display unit, wherein once it is detected that the switch is released, if it is detected that the switch is subsequently pressed again within a predetermined period of time, the same process is repeated.

6 Claims, 18 Drawing Sheets

(51) Int. Cl.
*G01C 21/36* (2006.01)
*G06F 3/01* (2006.01)
(52) U.S. Cl.
CPC ...... *G06F 3/017* (2013.01); *B60K 2350/1004* (2013.01); *B60K 2350/1052* (2013.01)
(58) Field of Classification Search
USPC .................................................. 701/36, 538
See application file for complete search history.

(56) References Cited

U.S. PATENT DOCUMENTS

| | | | |
|---|---|---|---|
| 8,177,182 B1 | 5/2012 | Wood et al. | |
| 9,168,928 B2 * | 10/2015 | Blaesing | G06F 3/017 |
| 9,256,779 B2 * | 2/2016 | Obata | G06K 9/00355 |
| 2005/0134117 A1 * | 6/2005 | Ito | B60R 16/0373 |
| | | | 307/10.1 |
| 2006/0085767 A1 | 4/2006 | Hinckley et al. | |
| 2011/0160933 A1 | 6/2011 | Suzaki et al. | |
| 2011/0169726 A1 | 7/2011 | Holmdahl et al. | |
| 2011/0221666 A1 | 9/2011 | Newton et al. | |
| 2012/0105613 A1 | 5/2012 | Weng et al. | |
| 2012/0272194 A1 | 10/2012 | Yang et al. | |
| 2013/0076615 A1 | 3/2013 | Iao | |
| 2013/0162535 A1 | 6/2013 | Nishida et al. | |

FOREIGN PATENT DOCUMENTS

| | | |
|---|---|---|
| JP | 2005-53092 | 3/2005 |
| JP | 2006-135703 A | 5/2006 |
| JP | 2006-285370 | 10/2006 |
| JP | 2006-312346 | 11/2006 |
| JP | 2009-104297 | 5/2009 |
| JP | 2009-248629 A | 10/2009 |
| JP | 2010-97332 A | 4/2010 |
| JP | 2010-184600 A | 8/2010 |
| JP | 2011-131833 A | 7/2011 |
| JP | 2012-147440 A | 8/2012 |
| JP | 2012-212237 A | 11/2012 |
| KR | 10-2010-0012654 | 2/2010 |
| WO | 2012/063247 A1 | 5/2012 |

OTHER PUBLICATIONS

Japanese Office Action dated Jan. 6, 2015, issued in Japanese Application No. JP2013-120899, filed Jun. 7, 2013 (English translation).
Chinese Office Action dated Jun. 29, 2016, issued in Chinese Application No. CN 201480032583.4.
Canadian Office Action for Canadian Application No. 2,914,712 dated Jan. 26, 2016 (Jan. 26, 2016).
Canadian Office Action dated Sep. 2, 2016, issued in Canadian Application No. 2,914,712.
Korean Office Action dated May 2, 2016, issued in Korean Application No. KR10-2015-7034801.
Extended Search Report dated Mar. 21, 2017, issued in EP Application No. 14807044.4.

* cited by examiner (a) (b)

GESTURE INPUT APPARATUS FOR CAR NAVIGATION SYSTEM

TECHNICAL FIELD

The present invention relates to a gesture input apparatus for operating a car navigation system by gestures.

BACKGROUND ART

Traditional methods for operating the car navigation system include operation methods using a remote controller or a touch panel. The operation methods using the remote controller include an operation type in which buttons for remote control (a controller) are provided on a steering wheel of a car (i.e., PTL 1). This type of operation enables a driver to perform operation while driving a car without moving his/her hands off the steering wheel. Further, there exist car navigation systems which allow a user to perform operation only with his/her utterance by designating a destination or the like by voice input.

However, since car navigation systems have been recently becoming multi-functional, but the remote controller has a limited space for buttons arranged thereon, it is difficult to arrange, on the remote controller, the buttons corresponding to multiple functions. It is particularly difficult to arrange many buttons on the remote controller provided on the steering wheel. Further, the operation by voice input has also problems such as incorrect recognition due to noise in the surroundings or the like.

To deal with these problems, methods are proposed in which a user operates the car navigation system by using gestures (i.e., PTL 2, PTL 3, and PTL 4). The operation by using gestures has advantages such as no necessity for gazing at or touching a screen, no problem in arranging buttons according to functions, and no degradation in the recognition rate due to noise in the surroundings or the like.

CITATION LIST

Patent Literature

PTL 1: Japanese Patent Laid-Open No. 2012-147440
PTL 2: Japanese Patent Laid-Open No. 2006-285370
PTL 3: Japanese Patent Laid-Open No. 2009-104297
PTL 4: Japanese Patent Laid-Open No. 2001-216069

SUMMARY OF INVENTION

Technical Problem

Car navigation systems have been recently becoming multi-functional and many of car navigation systems have functions in a hierarchical structure (a tree). Therefore, a user is required to perform a plurality of steps of selection, until the user reaches an intended final operation. Accordingly, performing all such operations by gestures increases the number of the operation steps, and thus is unrealistic.

In view of the above problems, an object of the present invention is to achieve, by simple gestures, the operation of a car navigation system in which a menu is in a hierarchical structure.

Solution to Problem

So as to solve the above problems, according to an aspect of the present invention, there is provided a method performed by a car navigation device having a sensor, a memory unit which stores an operation with respect to the car navigation device in which an operation menu is in a hierarchical structure and a gesture of a user in association with each other, a switch, and a display unit, the method including the steps of (a) detecting that the switch is pressed; (b) detecting the gesture via the sensor after the switch is pressed; (c) obtaining, from the memory unit, an operation associated with the detected gesture; (d) outputting, with respect to a screen displayed on the display unit at the time of detecting the gesture, a result of performance of the obtained operation to the display unit; and (e) detecting that the switch is released, wherein the step (b) to the step (e) are repeated if it is detected that the switch is pressed again within a predetermined period of time.

Further, another aspect of the present invention is a car navigation device which performs the above method.

Further, another aspect of the present invention is a computer program for causing a computer to execute the above method.

Further, another aspect of the present invention is a computer readable storage medium which stores a computer program for causing a computer to execute the above method.

Advantageous Effects of Invention

According to the present invention, a car navigation system can be operated by simple gestures.

DESCRIPTION OF EMBODIMENTS

Figure 1:
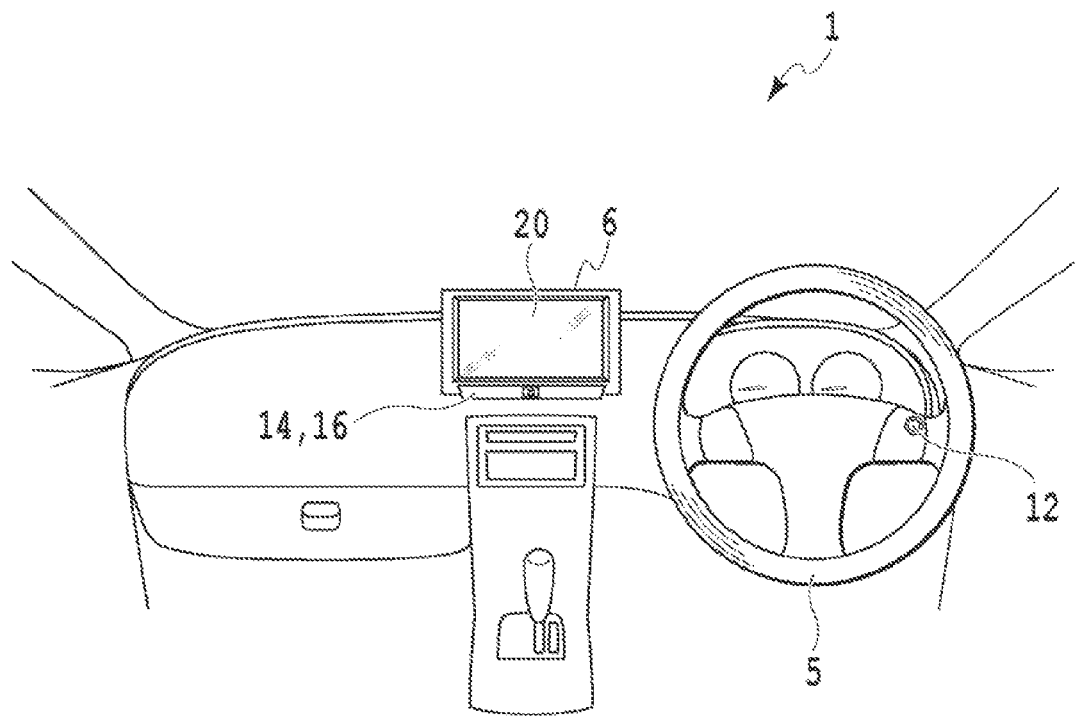
FIG. 1 is a view illustrating an appearance of a gesture input apparatus according to an embodiment of the present invention.

With reference to the drawings, an embodiment of the present invention will be described below. It should be noted that in the drawings for reference for the following explanation, portions equivalent to those in other drawings are denoted by the same numerals.

(Outline of Gesture Input Apparatus)

FIG. 1 is a view illustrating an appearance of a gesture input apparatus according to the present embodiment. A gesture input apparatus 1 shown in FIG. 1 has, as examples, a switch 12 provided on a steering wheel 5 of a car, a display unit 20 provided on a car navigation device 6, and a sensor 14 and a light 16 integrally formed below the display unit 20.

The switch 12 is a switch for switching between acceptance and denial of reception of a gesture operation. In detecting a body motion of a user by the sensor 14, in a case where the user accidentally moves his/her body, with no intention of operating a car navigation system, within a detectable range of the sensor 14, the gesture input apparatus 1 may possibly misrecognize the motion as a gesture for operating the car navigation system. In order to avoid such a problem, when performing a gesture operation, the user presses the switch 12 and then starts making a gesture. The gesture detected after the switch 12 is pressed is recognized as a gesture for operating the car navigation system.

The sensor 14 is an image capturing device for detecting a gesture of a user and the light 16 is a light for securing the amount of light in the surroundings when the sensor 14 captures an image of the gesture of the user. Specifically, the light 16 may be visible light, for example, white LED and the like. The light 16 may also be a light for detecting a three-dimensional position in a case where the sensor 14 is a so-called depth camera, which can measure the depth (the distance from the light 16 to an object to be captured) (in this case, the light 16 may adopt invisible light). In the surroundings of the gesture input apparatus 1, the luminance significantly varies particularly in the daytime (due to the weather, direct sunlight, shade, and the like). This affects a gesture recognition process with the sensor 14. The gesture input apparatus 1 has the light 16, thereby an improvement and broader range of gesture recognition of the sensor 14 can be expected. Further, with an illuminometer provided, only in a case where the level of illumination in the surroundings is below a predetermined value, the light 16 may be turned on.

It should be noted that in the example of FIG. 1, the sensor 14 and the light 16 are integrally formed and are arranged below the display unit 20 of the car navigation device 6 disposed between a driver's seat and a passenger's seat. The configuration as in FIG. 1 is suitable for performing gestures by a left hand with respect to the sensor 14 below the display unit 20 (a right-hand drive car is assumed in FIG. 1).

Further, the switch 12 is disposed on a window side of the steering wheel 5, that is, a side opposite to the side on which the sensor 14 for detecting gestures is disposed. This configuration enables a user to smoothly perform a gesture operation with his/her left hand after pressing the switch with his/her right hand.

Furthermore, in FIG. 1, the light 16 is integrally formed with the sensor 14, but may be formed in another configuration. For example, the light 16 may be provided on a ceiling portion of a vehicle body where the view of a driver is not blocked. As stated above, the switch 12 determines the start of a gesture operation and thus the light 16 needs to emit light only when an image of a gesture is captured. Accordingly, the light 16 may be turned on and off in association with the switch 12. In this configuration, the switch 12 is turned on to perform a gesture operation and the light 16 is turned on in association with the switch 12 only when the image of the gesture is captured, thereby reducing power consumption. Also in capturing an image of a gesture in the nighttime, since whenever the sensor 14 captures the image, the light 16 is turned on, good usability is achieved.

(Configuration of Gesture Input Apparatus)

Figure 2:
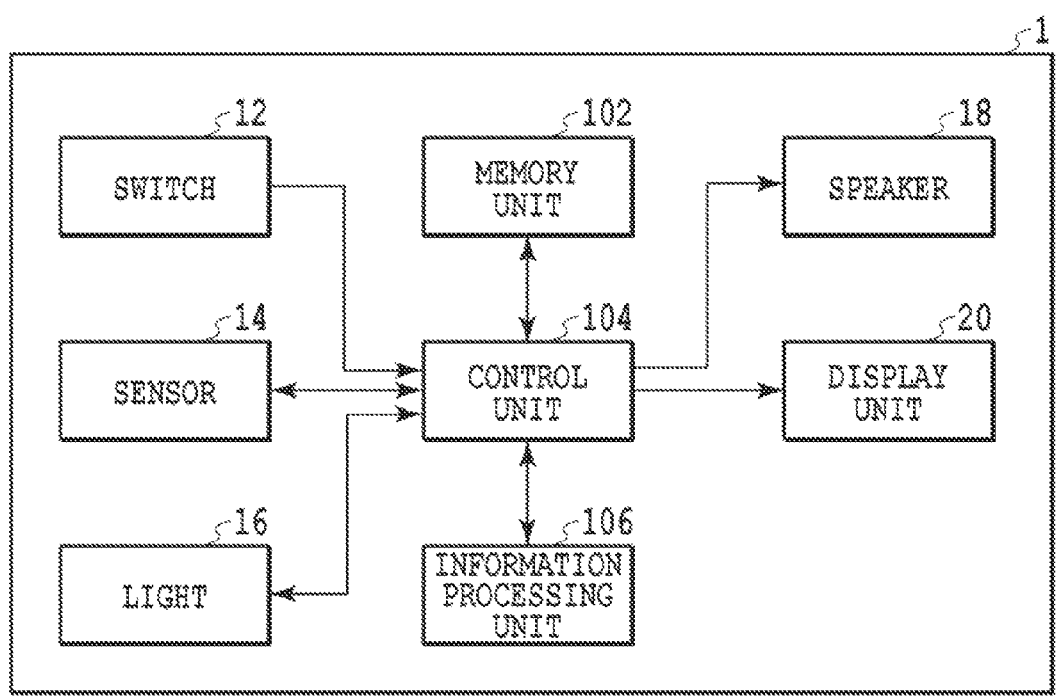
FIG. 2 is a functional block diagram illustrating a configuration of the gesture input apparatus according to the embodiment of the present invention.

FIG. 2 is a functional block diagram illustrating an example of a configuration of the gesture input apparatus according to the present embodiment. The gesture input apparatus 1 has the switch 12, the sensor 14, the light 16, a speaker 18, the display unit 20, a memory unit 102, a control unit 104, and an information processing unit 106.

The control unit 104 receives signals indicative of ON/OFF of the switch 12, image data of a gesture of a user which is captured by the sensor 14, and the like, and receives output data from and controls the other constituent elements. Pieces of data received with the control unit 104 are stored in the memory unit 102, as necessary, and the data stored in the memory unit 102 is appropriately read by the control unit 104 to be processed by the information processing unit 106.

The information processing unit 106 reads and processes a program and data necessary for processes which are stored in the memory unit 102 to realize each of the processes in the gesture input apparatus 1.

Further, the memory unit 102 stores gestures and user operations signified by the gestures in association with each other. Once the sensor 14 captures an image of a gesture of a user and the information processing unit 106 performs an image recognition process, the control unit 104 refers to data in the memory unit 102 and reads an operation which is associated with the recognized gesture. Based on the read operation, the information processing unit 104 generates a screen of a result after performing this operation with respect to a screen displayed on the display unit 20 of the car navigation device 6, and the control unit 104 outputs the screen of the result to be redisplayed on the display unit 20.

Furthermore, the memory unit 102 may store a gesture, each of the screens which are displayed on the display unit 20, and a user operation signified by the gesture in each of the screens in association with one another. This allows different operations to be performed for each of the screens depending on the screen displayed on the display unit 20 at the time of performing the gesture, even if the same gesture is made. Accordingly, the number of gestures which the user should know for performing operations can be reduced.

Figure 3:
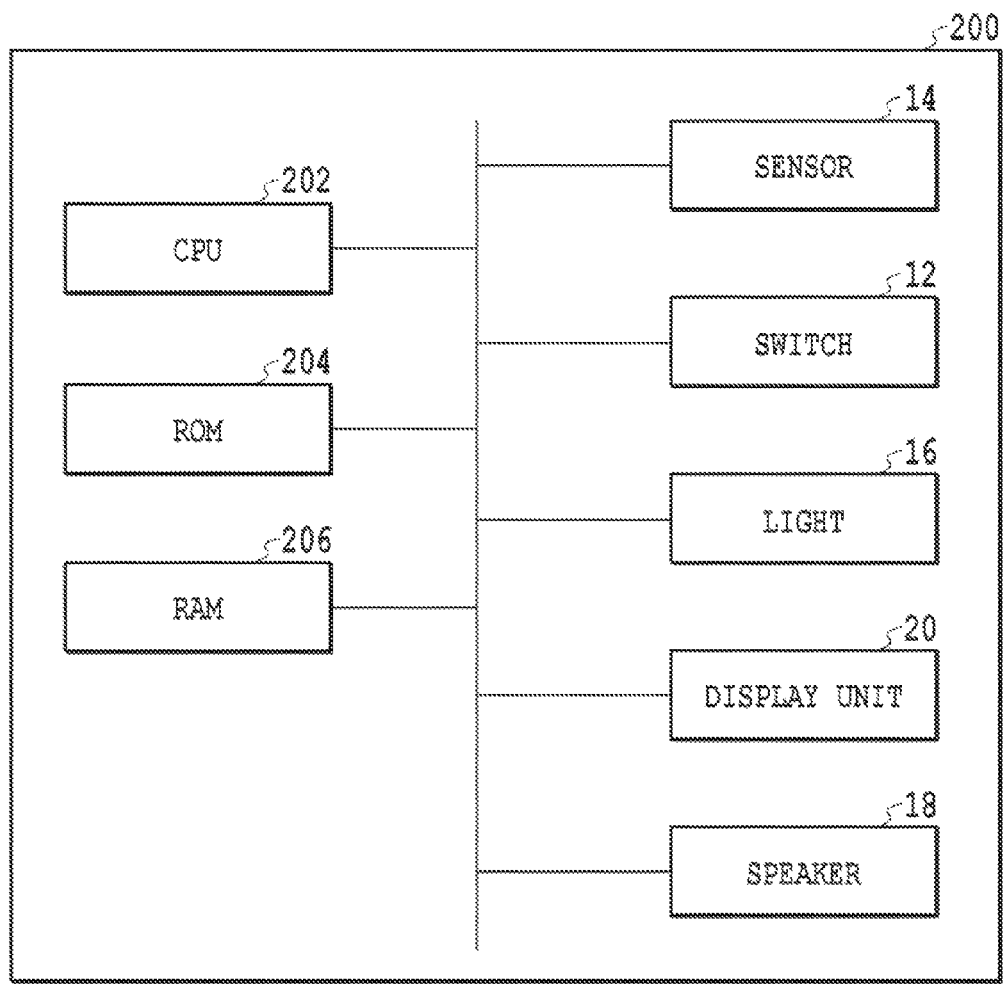
FIG. 3 is a diagram illustrating a hardware configuration of the gesture input apparatus according to the embodiment of the present invention.

FIG. 3 is a diagram illustrating an example of a hardware configuration of the gesture input apparatus according to the present embodiment. As stated above, the gesture input apparatus according to the present embodiment, which is a computer device 200, has the sensor 14, the switch 12, the light 16, the display unit 20, and the speaker 18. Further, the gesture input apparatus according to the present embodiment has a CPU (Central Processing Unit) 202, a volatile memory device or a nonvolatile memory device, such as a ROM (Read Only Memory) 204, and a RAM (Random Access Memory) 206, similarly to general computer devices. Furthermore, the gesture input apparatus according to the present embodiment may have a hard disc and a connection interface of a removable storage medium which are not shown in FIG. 3.

Here, the memory unit 102 in FIG. 2 corresponds to, for example, the ROM 204 and RAM 206 in FIG. 3, and the control unit 104 in FIG. 2 mainly corresponds to the CPU 202 which is a control unit in FIG. 3. Further, the function of the information processing unit 106 in FIG. 2 is realized by the CPU 202 in FIG. 3 reading a program stored in the ROM 204 or the like to process the program on a temporary memory.

(Specific Example of Gesture Operation)

An explanation will be given below of a specific example of a gesture operation in the gesture input apparatus according to the present embodiment. It should be noted that it is assumed that the gesture input apparatus according to the present embodiment has a menu (or operations performed with respect to a car navigation system; the same applies hereinafter) of the car navigation system operated by a user in a hierarchical structure. For simplicity, an explanation will be given of an example of a case where the menu of the car navigation system is in two stages.

Here, the menu of the car navigation system only needs to be in a hierarchical structure and the menu is conceived to be in various configurations. The examples include a case in which in a first step, a function (such as a car navigation function, TV, music playback, and video playback) provided on the car navigation system is selected and in a second step, an executable operation (such as channel selection, music folder (album) selection, and video category selection) with respect to the selected function is performed.

The following explanation will be given of an example in which in the first step, a function is selected and in the second step, an executable operation with respect to the selected function is selected.

[First Step]

Figure 4:
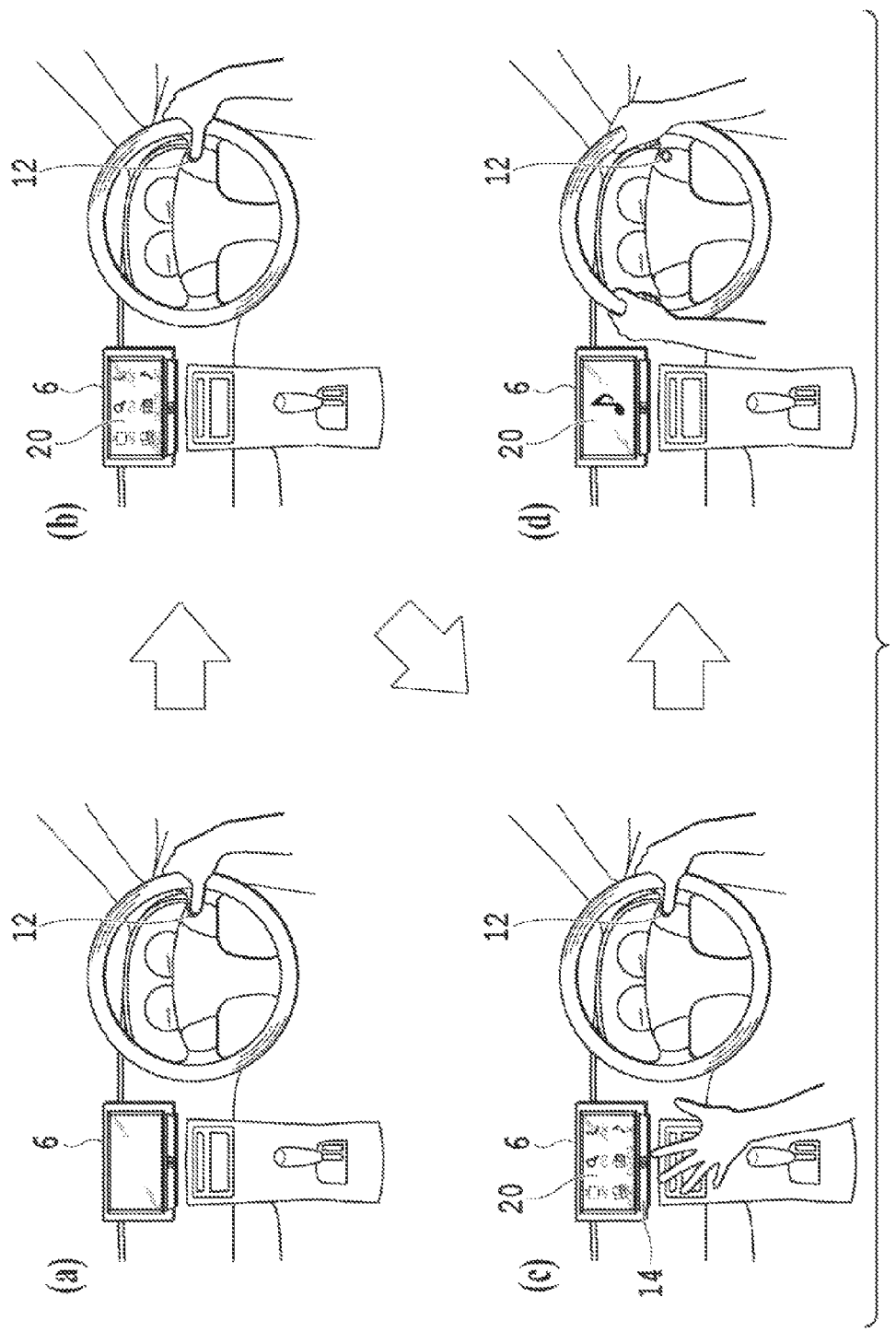
FIG. 4 shows views of a specific example of a gesture operation in a first step.

FIG. 4 is a specific example of a gesture operation in the first step. In performing the gesture operation, first, a user (a driver in this example) presses the switch 12 (which is kept pressed until the gesture operation is finished) (FIG. 4(a)). Once the user presses the switch 12, the gesture input apparatus recognizes a gesture for operating the car navigation device 6 to be started. Here, the light 16 may be turned on and the sensor 14 may start capturing an image. Further, a screen for selecting a function is displayed on the display unit 20 of the car navigation device 6 (FIG. 4 (b)). Specifically, functions such as a "car navigation system," "TV," "music playback," and "video playback" are displayed with icons or the like. In addition to the above, voice feedback regarding display confirmation may be output from the car navigation device 6. The voice feedback allows the user to confirm the result of the gesture operation without visually recognizing the display unit 20, thereby eliminating the need to gaze at and touch the screen as required in traditional car navigation system operation methods. Such an advantage of the gesture operation becomes more beneficial.

Once the screen for selecting a function is displayed on the display unit 20 of the car navigation device 6, the user makes a gesture by his/her hand within a detectable range of the sensor 14 (FIG. 4(c)). During this time, the user keeps pressing the switch 12. Then, a function associated, in advance, with the detected gesture is selected and the result of the selection (for example, a screen of the selected function (such as a TV reproduction screen and a music album folder selection screen)) is displayed on the display unit 20 of the car navigation device 6 (FIG. 4 (d)). In this case also, voice feedback regarding display confirmation may be provided. Subsequently, once the user releases the switch 12, the gesture input apparatus determines that the gesture for operation is finished, and the first step ends (at this time, the light 16 and the sensor 14 may be turned off and so forth).

It should be noted that in a case where a screen of a function which the user intends to operate is already displayed on the display unit 20, the above first step may be skipped to start from the following second step by instantaneously pressing the switch 12 in FIG. 4(a).

[Second Step]

Figure 5:
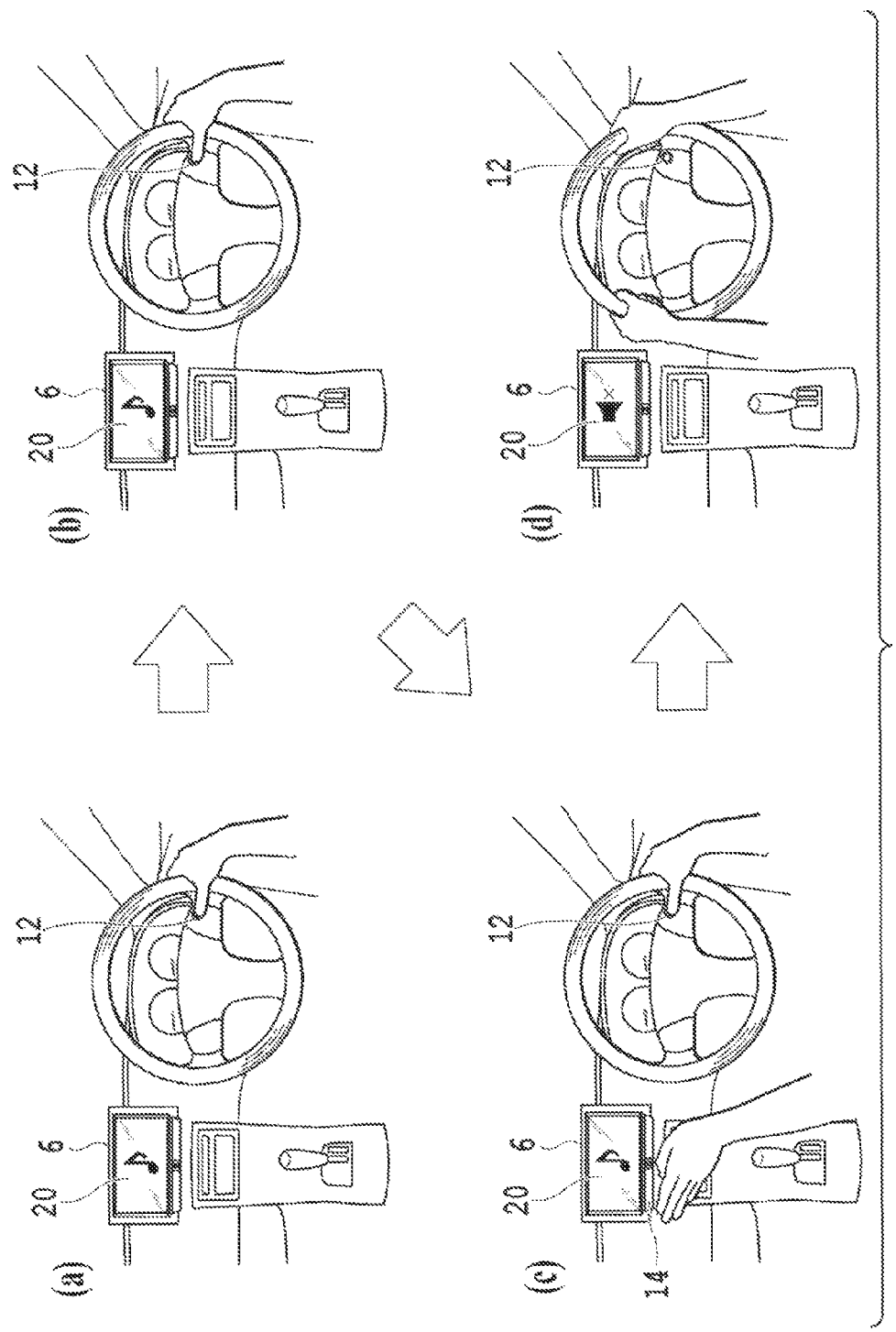
FIG. 5 shows views of a specific example of a gesture operation in a second step.

FIG. 5 is an example of a gesture operation in the second step. The user presses the switch 12 again within a predefined period of time after the first step is finished, and then the gesture input apparatus recognizes the second step to be started.

Once the user presses the switch 12 again within a predetermined period of time (the switch is kept pressed until the gesture operation is finished) after the screen of the selected function is displayed on the display unit 20 of the car navigation device 6 by the operation in the first step (FIG. 5(a)), the gesture input apparatus recognizes a gesture for operation of the car navigation device 6 to be started (for example, the light 16 may be turned on again and image capturing by the sensor 14 may be resumed). Further, at this time, the screen of the selected function or the like (a TV reproduction screen (in a case where "TV" is selected in the first step) or a music album folder selection screen (in a case where "music playback" is selected in the first step)) may be displayed on the display unit 20 of the car navigation device 6 (FIG. 5(b)). In addition to the above, voice feedback regarding display confirmation may be output from the car navigation device 6.

Once the screen of the selected function is displayed on the display unit 20 of the car navigation device 6, the user makes a gesture by his/her hand within a detectable range of the sensor 14 (FIG. 5(c)). During this time, the user keeps pressing the switch 12. Then, an operation with respect to the selected function associated, in advance, with the gesture detected by the sensor 14 is performed and a result of the performance is displayed on the display unit 20 of the car navigation device 6 (FIG. 5(d)). In this case also, voice feedback regarding display confirmation may be provided. Subsequently, once the user releases the switch 12, the gesture input apparatus determines that the gesture for operation is finished, and the second step ends (at this time, the light 16 and the sensor 14 may be turned off and so forth).

It should be noted that in a case where the menu is in a hierarchical structure in three stages or more, by similarly repeating the above second step, a gesture operation can be realized.

Here, in traditional gesture operation techniques, in a case where a plurality of gesture operations are continuously performed, the boundary of the gesture operations cannot be determined, thereby posing a problem in which a motion of a user's hand or the like in transition from a gesture to another gesture causes misrecognition. On the other hand, in the gesture input apparatus according to the present embodiment, with respect to the menu in a hierarchical structure, the timing of gestures in the first step or the second step can be clearly defined by pressing the switch 12 as stated above, and thus misrecognition in transition from a gesture to another gesture among a plurality of gestures can be avoided.

Further, as conventionally performed, in a case where a menu is in a hierarchical structure, when operations on screens (such as selection of a function and an operation with respect to the selected function), operations for transition in the hierarchical menu structure (for example, transition from "selection of a function" to "operation with respect to the selected function"), and the like are all performed by gestures made by a user, there is a problem in which gesture operations become complicated, thereby increasing the possibility of occurrence of misrecognition. Meanwhile, in the gesture input apparatus according to the present embodiment, pressing of the switch 12 and making a gesture are combined to define the timing of the start and finish of the gesture operation. That is, by pressing and subsequently releasing the switch 12, the gesture operation is confirmed to make transition to a menu in the next hierarchy. This omits gesture operations for transition to a menu in the next hierarchy and the like, which are conventionally performed, to achieve more simplified gesture operations.

(Variations of Gesture Operation)

Variations of gesture operations will be described below.

[Specific Examples of Gesture Signs]

Figure 6:
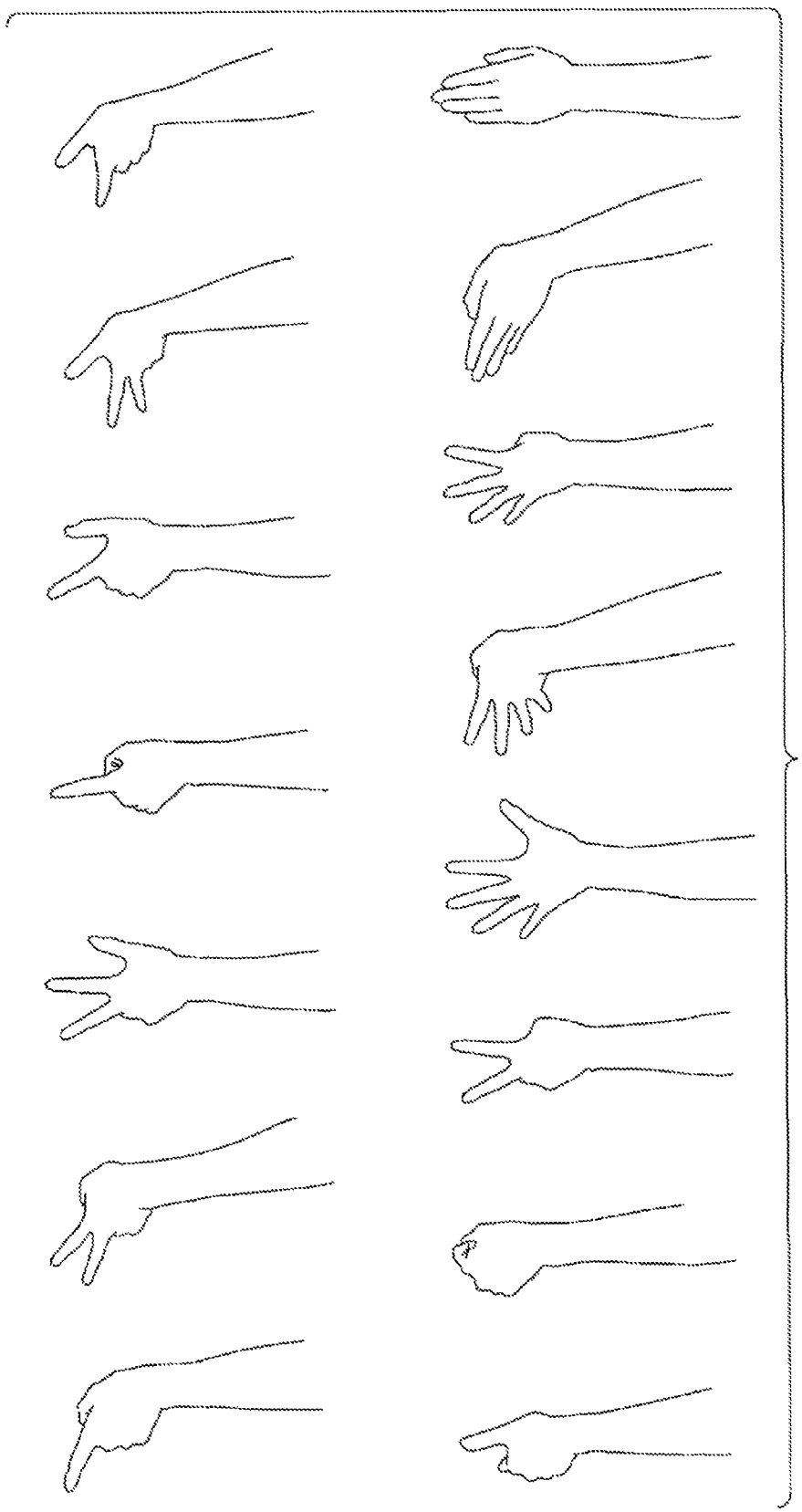
FIG. 6 is a view illustrating specific examples of gesture signs.

FIG. 6 is a view illustrating specific examples of gesture signs using shapes of a user's hand. Gesture operations may be performed by using any of gesture signs shown in FIG. 6, a motion of waving a hand, and the like, and a combination thereof.

[Examples of Gesture Operation in the First Step]

Figure 7A:
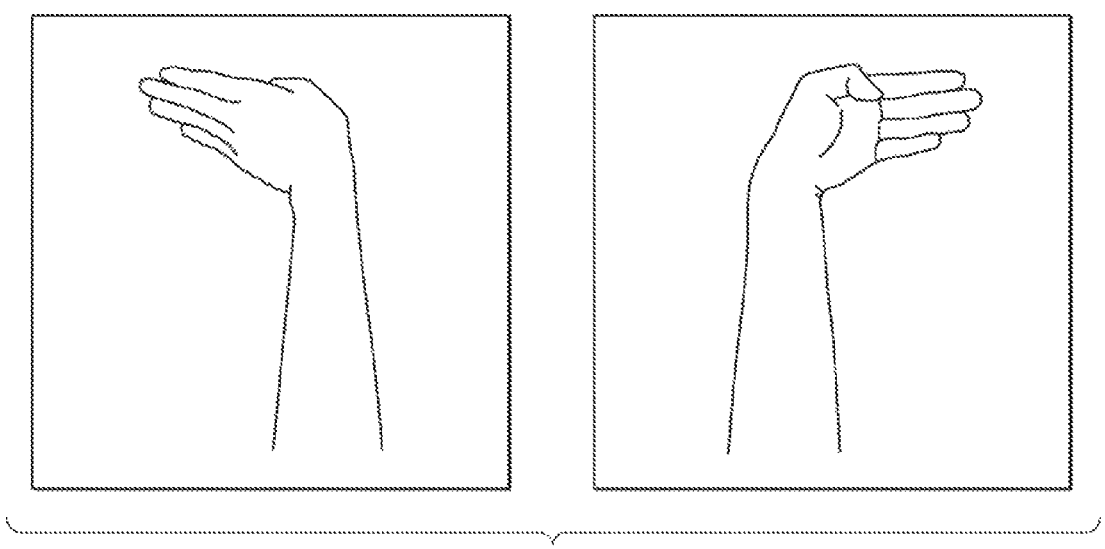
FIG. 7A shows views of examples of a gesture operation in the first step.
Figure 7B:
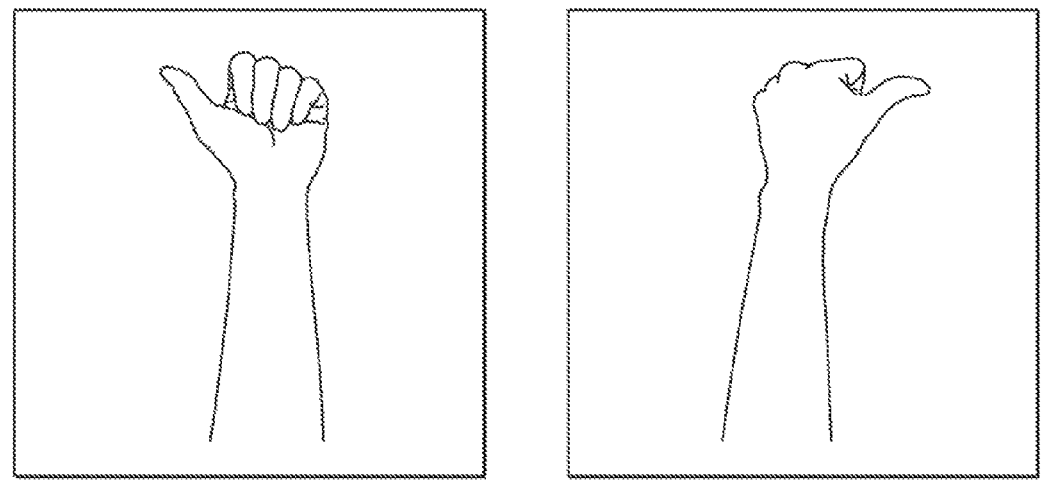
FIG. 7B shows views of examples of a gesture operation in the first step.
Figure 8:
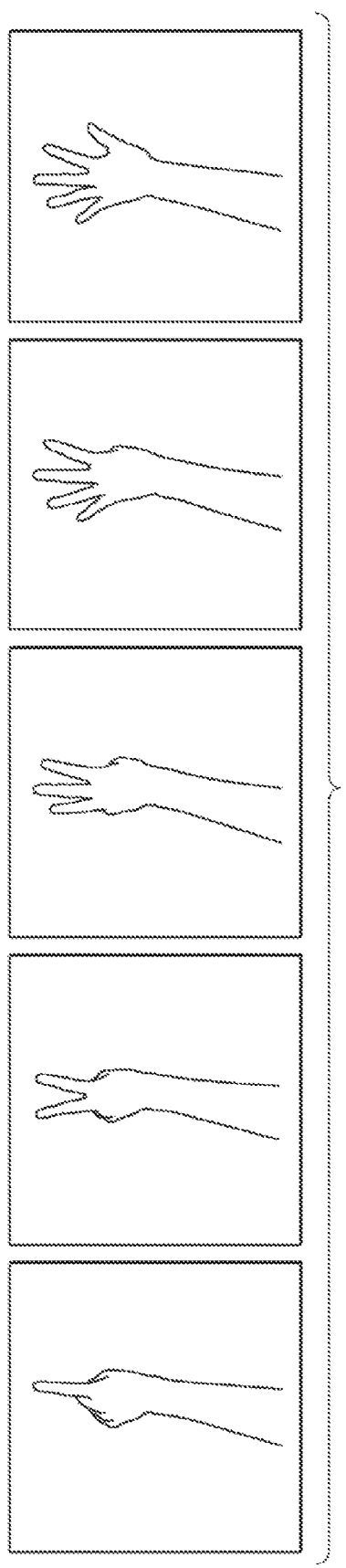
FIG. 8 shows views of examples of a gesture operation in the first step.

FIG. 7A, FIG. 7B, and FIG. 8 show views of examples of gesture operations in the first step. In a case where a function is selected in the first step described above, as shown in FIG. 7A and FIG. 7B, by pointing left and right, any of a plurality of functions listed in a lateral direction on the screen of the display unit 20 may be selected.

Further, as shown in FIG. 8, a specific function may be directly indicated by a gesture sign. More specifically, for example, the gesture input apparatus 1 holds, in the memory unit 102, data in which each of gesture signs as shown in FIG. 8 (or a motion of waving a hand, a combination of a gesture sign and a motion of waving a hand, and the like) is associated, in advance, with each of the functions of the car navigation device 6. Then, upon receipt of a gesture of a user via the sensor 14, the gesture input apparatus 1 accesses the data in the memory unit 102 to obtain a function associated with the received gesture, and whereby determines the function selected by the user (hereinafter the same applies to the gesture operation in the second step).

[Examples of Gesture Operation in the Second Step]

Figure 9A:
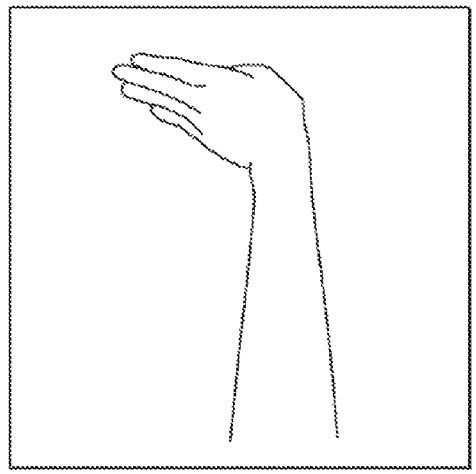
FIG. 9A shows views of examples of a gesture operation in the second step.
Figure 9A:
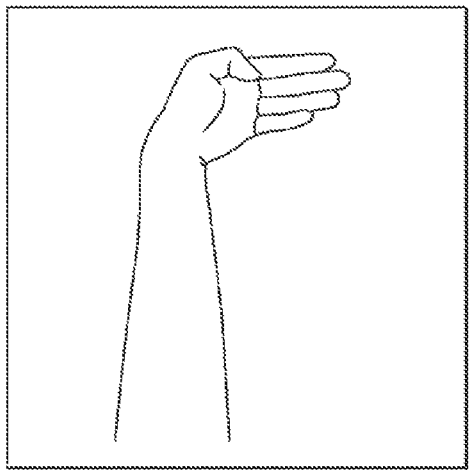
Figure 9B:
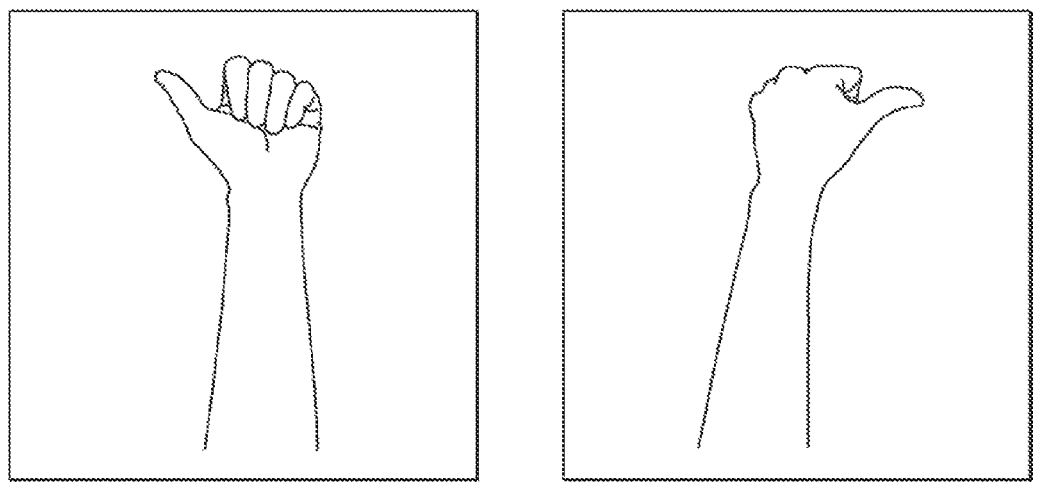
FIG. 9B shows views of examples of a gesture operation in the second step.
Figure 9C:
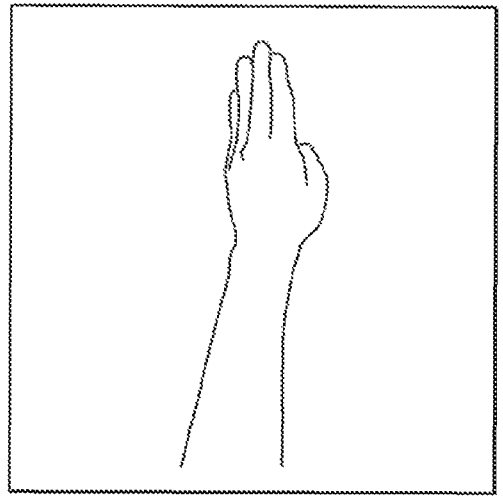
FIG. 9C shows views of examples of a gesture operation in the second step.
Figure 9C:
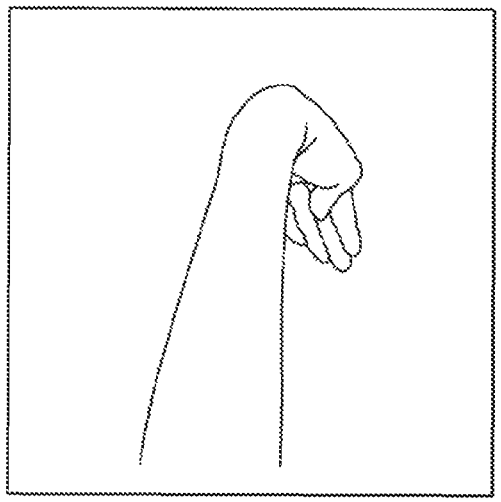
Figure 9D:
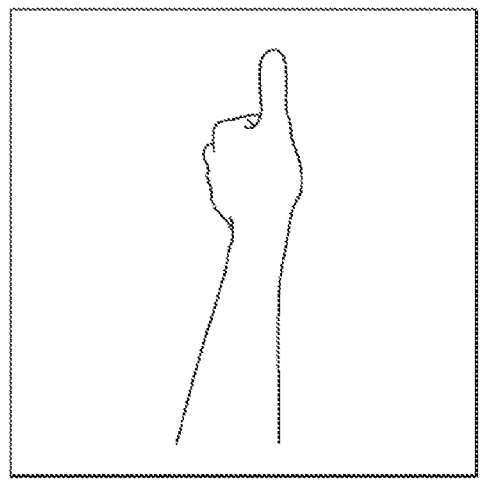
FIG. 9D shows views of examples of a gesture operation in the second step.
Figure 9D:
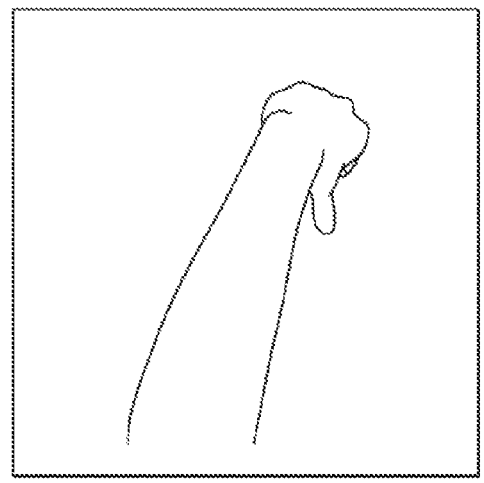

FIG. 9A to FIG. 9D, FIG. 10A, and FIG. 10B show views of examples of gesture operations in the second step. For example, in a case where a function selected in the first step is "TV" and a gesture operation is performed with respect to the TV screen in the second step, channels may be changed in a forward direction or a reverse direction by pointing left or right as shown in FIG. 9A and FIG. 9B and volume may be turned up or down by pointing up or down as shown in FIG. 9C and FIG. 9D.

Further, in a case where a function selected in the first step is "music playback," in the second step, album folders by unit may be changed in a forward direction or a reverse direction by turning, to the right or the left, the entire hand with fingers stretched as shown in FIG. 9A, and further the order of music units may be switched between an ascending order and a descending order by pointing left and right with a thumb of a hand as shown in FIG. 9B. Furthermore, volume may be turned up or down by turning up or down the entire hand with fingers stretched as shown in FIG. 9C and sound quality may be adjusted by pointing up or down with a thumb of a hand as shown in FIG. 9D.

Figure 10A:
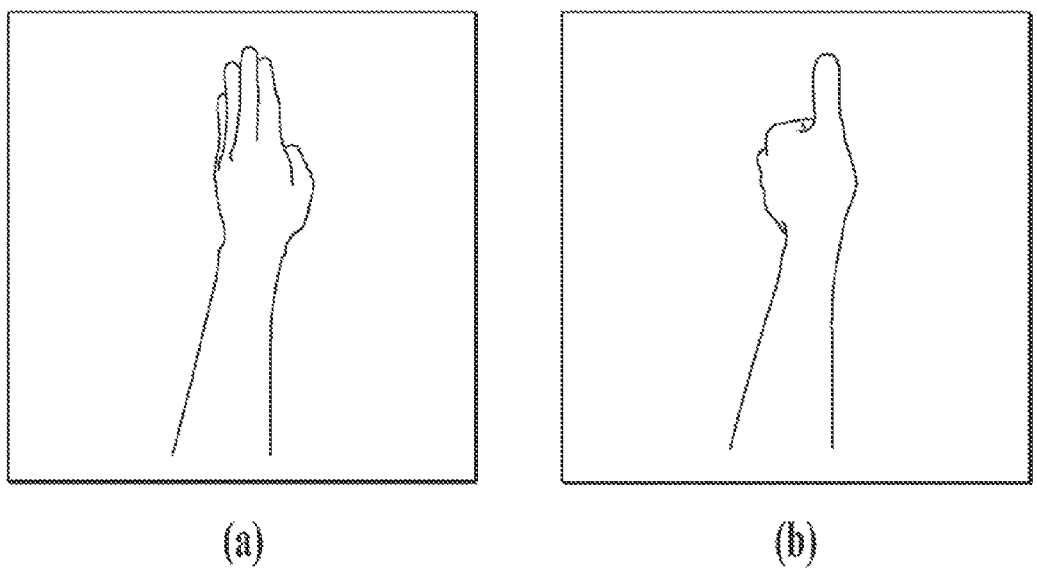
FIG. 10A shows views of examples of a gesture operation in the second step.
Figure 10B:
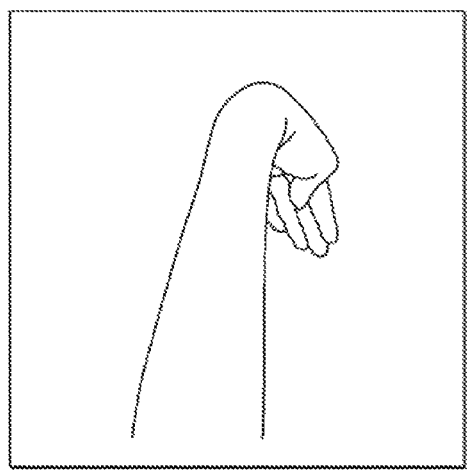
FIG. 10B shows views of examples of a gesture operation in the second step.
Figure 10B:
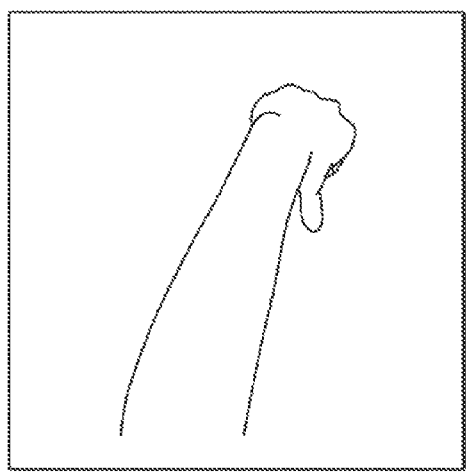

Moreover, in a case where an executable operation with respect to the function selected in the first step involves selecting one out of two choices, such as "answering/rejecting a telephone call" and "turning ON/OFF an air conditioner," the operation for "answering" or "turning ON" may be performed by pointing up as shown in FIGS. 10A(a) and 10A(b), and the operation for "rejecting" or "turning OFF" may be performed by pointing down as shown in FIGS. 10B(a) and 10B(b).

It should be noted that the examples of gesture operations in the first step and the second step described above are examples and gesture operations are not limited to these operations. Functions which can be selected in the first step by the car navigation device 6 may be set in various manners, and there may be a variety of executable operations with respect to the functions. As the operations in the second step, for example, the following is conceived: change of a map scale (wide/detailed), music selection control (next music/previous music), music control (playback/stop), volume control +/−, mute (ON/OFF), change of map orientation (heading up/north up), one way indication (ON/OFF), traffic signal guide indication (ON/OFF), rear camera image display (ON/OFF), selection of TV station (next station/previous station), radio (AM/FM, next station/previous station), and the like.

(Process Flow)

Figure 11:
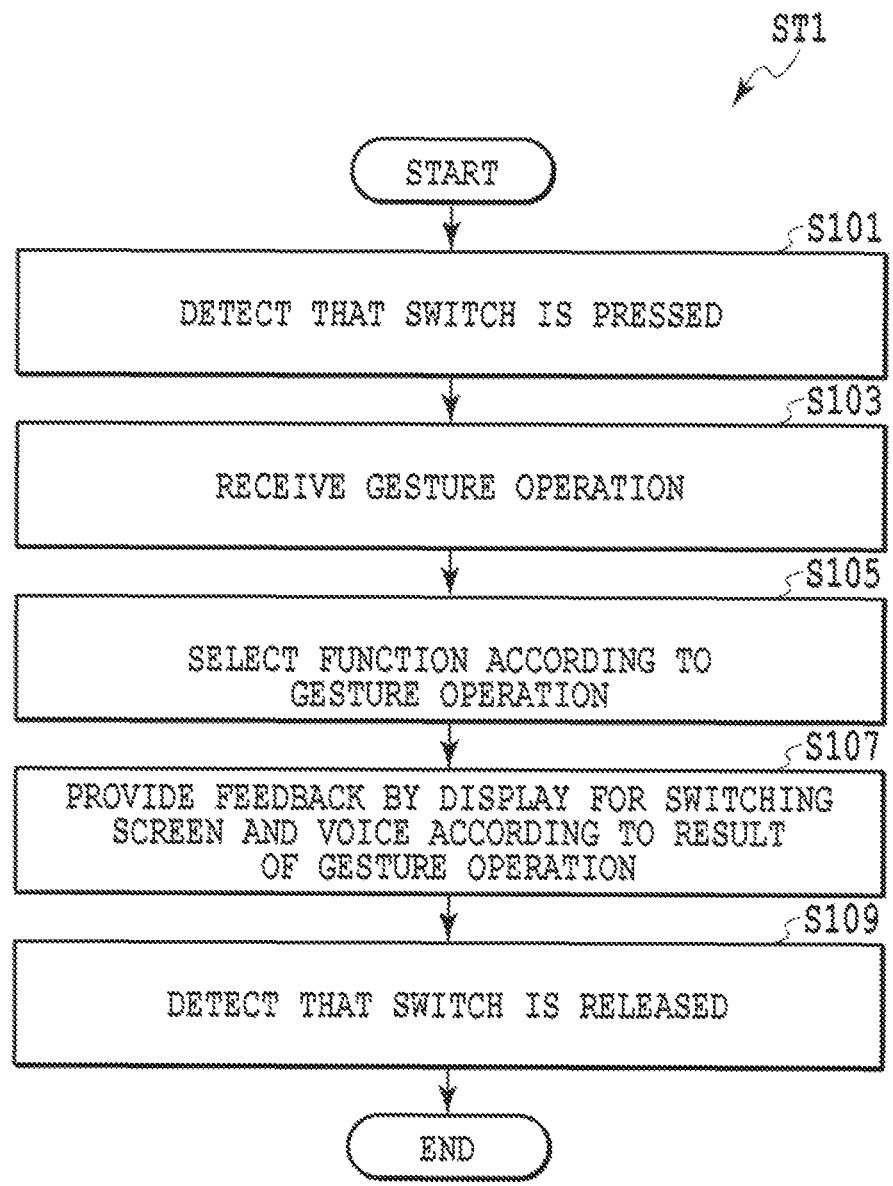
FIG. 11 is a flowchart illustrating an example of a process in the first step in the gesture input apparatus according to the embodiment of the present invention.
Figure 12:
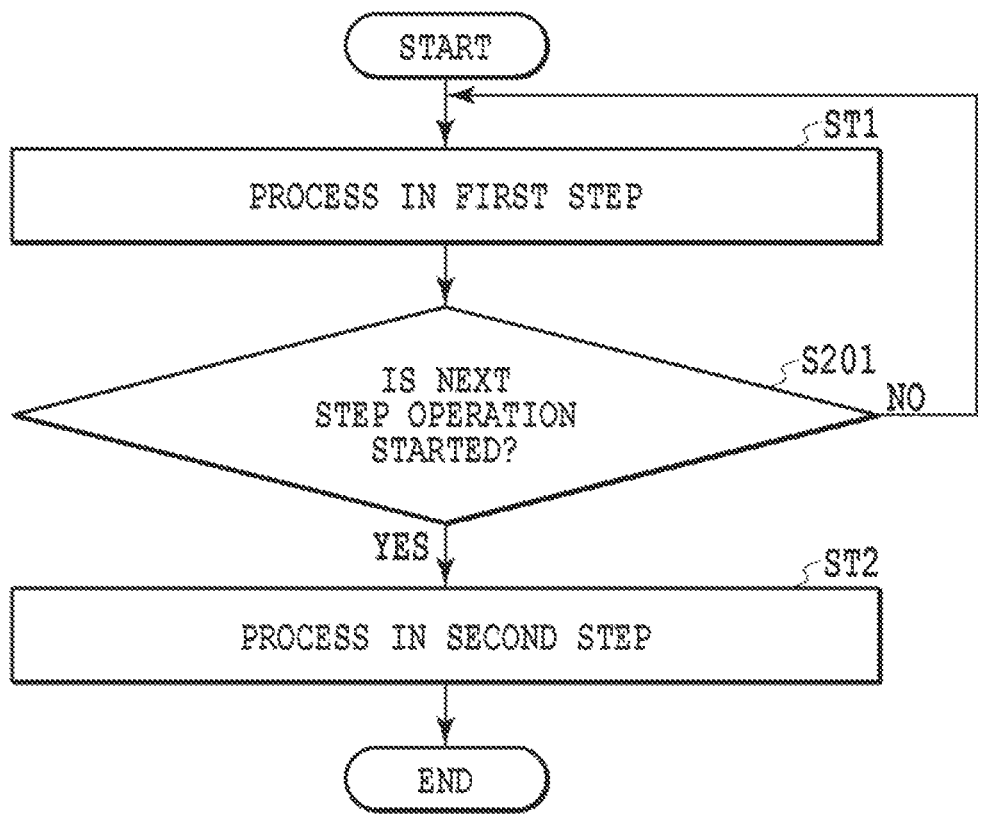
FIG. 12 is a flowchart illustrating an example of a process of determining whether a process in the second step is continuously performed after the process in the first step in the gesture input apparatus according to the embodiment of the present invention.
Figure 13:
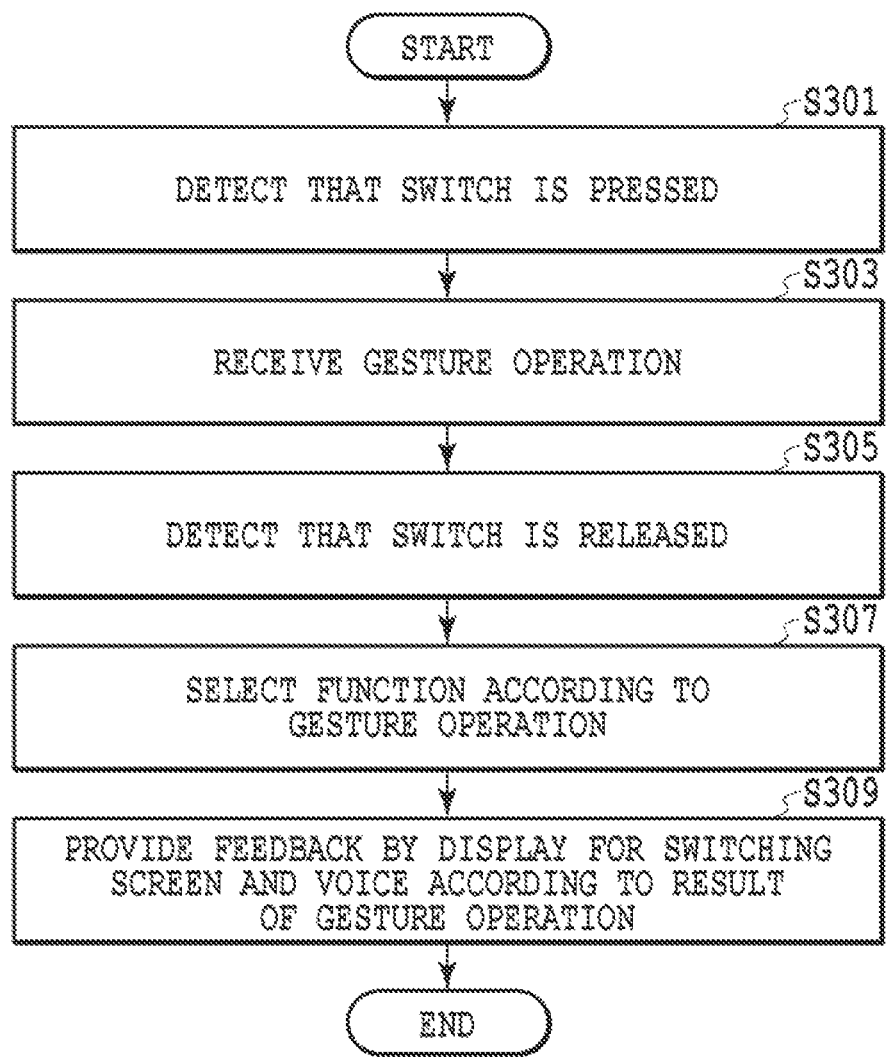
FIG. 13 is a flowchart illustrating another example of the process in the first step in the gesture input apparatus according to the embodiment of the present invention.

With reference to FIG. 11 to FIG. 13, an explanation will be given of an example of a process in the gesture input apparatus according to the present embodiment.

Referring first to FIG. 11, FIG. 11 is a flowchart illustrating a process ST1 in the first step. In the beginning, it is detected that the switch 12 is pressed by a user (step S101). A gesture operation by the user is received via the sensor 14 (step S103). A function is selected (determined) according to the received gesture operation (step S105).

According to a result of the gesture operation, feedback is provided for switching a screen on the display unit 20 and voice output (step S107). Once it is detected that the switch 12 is released (step S109), the gesture input apparatus 1 determines that the gesture operation in the first step is finished, and the process ends. It should be noted that also in the second step, the process is performed following a process flow similar to that in FIG. 11.

FIG. 12 is a flowchart illustrating an example in which determination is made as to whether the process in the second step is continuously performed after the process in the first step. By detecting that the switch 12 is pressed again after the process in the first step (ST1) as shown in FIG. 11 is finished, determination is made as to whether an operation in the next step is started within a predetermined period of time (step S201). In a case where the operation in the next step is started in the predetermined period of time (a case where the switch 12 is pressed), the process in the second step is performed (ST2). Here, in a case where the gesture input apparatus 1 detects that the switch 12 is pressed after the predetermined period of time has elapsed, the gesture input apparatus 1 determines that a gesture operation in the first step is restarted, instead of a gesture operation in the second step being started, and performs the process. It should be noted that the details of the process in the second step will be omitted since the process is performed following a process similar to that shown in FIG. 11.

FIG. 13 is a flowchart illustrating another example of the process ST1 in the first step. First, it is detected that the switch 12 is pressed by a user (step S301). A gesture operation by the user is received via the sensor 14 (step S303). Once it is detected that the switch 12 is released (step S305), a function is selected (determined) according to the received gesture operation (step S307). For example, in a case where a gesture operation involves selecting any of a plurality of functions listed on the display unit 20, once the release of the switch 12 is detected in step S305, the function or the like selected (for example, highlighted by placing a cursor or being focused) at the time of releasing the switch 12 may be determined to be the result of selection in step S307.

According to the result of the gesture operation, feedback is provided by a display for switching a screen on the display unit 20 and voice output (step S309), and the process ends.

In other words, a difference from the example of FIG. 11 is that with the release of the switch as a trigger, determination is made that the gesture operation is finished to determine the gesture operation of the user. According to such a process flow, the timing when the gesture operation is finished becomes clear, thereby making it possible to simplify the process of the gesture operation.

Further, in the above-described embodiment, the user keeps pressing the switch 12 while performing the gesture operation, but determination of the timing of the start and finish of the gesture operation may be made by pressing for a certain period of time or longer and releasing the switch 12 (long press), pressing the switch 12 in a predetermined pattern, or the like, at each timing of the start and finish of the gesture operation.

(Conclusion)

The description has been given of the embodiment of the present invention, but the present invention is not limited to the above-described embodiment and, needless to say, may be performed in various different forms within the scope of the technical idea of the present invention.

The scope of the present invention is not limited to the exemplary embodiment illustrated in the drawings, but encompasses any embodiment which produces effects equivalent to those directed by the present invention. Further, the scope of the present invention is not limited to a combination of the features of the invention defined by the claims, but can be defined by any desired combination of specific features among all the features stated herein.

The invention claimed is:

1. A method performed by a car navigation device having a sensor for capturing an image of a gesture of a user, a memory unit which stores an operation with respect to the car navigation device in which an operation menu is in a hierarchical structure and a gesture of a user in association with each other, a switch, and a display unit, the method comprising the steps of:
    (a) detecting that the switch is pressed;
    (b) capturing an image of a gesture via the sensor while the switch is pressed;
    (c) obtaining, from the memory unit, an operation associated with the captured image of the gesture;
    (d) outputting, with respect to a screen displayed on the display unit at the time of capturing the image of the gesture, a result of performance of the obtained operation to the display unit; and
    (e) detecting that the switch is released,
    wherein the step (b) to the step (e) are repeated with an operation menu corresponding to previously performed operation if it is detected that the switch is pressed again within a predetermined period of time from executing the step (e).

2. The method according to claim 1, wherein the step (b) to the step (e) are repeated with a same operation menu as that of last time if it is detected that the switch is pressed again after a predetermined period of time.

3. The method according to claim 1, wherein the car navigation device further includes a light, and with performing of the step (a) as a trigger, the light is turned on and with performing of the step (e) as a trigger, the light is turned off.

4. The method according to claim 1, wherein in the step (d), in addition to output to the display unit, the result of performance is output by voice output.

5. A car navigation device performing the method according to claim 1.

6. A non-transitory computer readable storage medium which stores a computer program for causing a computer to execute the method according to claim 1.

* * * * *